US009547958B2

(12) United States Patent
Cole et al.

(10) Patent No.: US 9,547,958 B2
(45) Date of Patent: Jan. 17, 2017

(54) GAMING SYSTEM AND METHOD PROVIDING A VIDEO POKER GAME WITH POSITIONAL MATCHING CARD WINNING OPPORTUNITIES

(71) Applicant: IGT, Las Vegas, NV (US)

(72) Inventors: James M. Cole, Reno, NV (US); Michael David Capsouto, Sparks, NV (US)

(73) Assignee: IGT, Las Vegas, NV (US)

( * ) Notice: Subject to any disclaimer, the term of this patent is extended or adjusted under 35 U.S.C. 154(b) by 234 days.

(21) Appl. No.: 14/010,047

(22) Filed: Aug. 26, 2013

(65) Prior Publication Data

US 2015/0057062 A1 Feb. 26, 2015

(51) Int. Cl.
*G06F 17/00* (2006.01)
*G07F 17/32* (2006.01)

(52) U.S. Cl.
CPC ....... *G07F 17/3293* (2013.01); *G07F 17/3267* (2013.01)

(58) Field of Classification Search
CPC .............. G07F 17/3293; G07F 17/3262; G07F 17/3267
See application file for complete search history.

(56) References Cited

U.S. PATENT DOCUMENTS 3,998,462 A * 12/1976 Goott ............................ 273/274
4,222,572 A * 9/1980 Baker ............................ 273/306
4,364,567 A * 12/1982 Goott ............................ 273/237
5,167,413 A 12/1992 Fulton
5,251,897 A 10/1993 Fulton
5,308,065 A 5/1994 Bridgeman et al.
5,322,295 A 6/1994 Cabot et al.
5,332,228 A 7/1994 Schultz
5,411,257 A 5/1995 Fulton
5,431,408 A 7/1995 Adams
5,437,451 A 8/1995 Fulton
5,531,448 A 7/1996 Moody
5,636,842 A 6/1997 Cabot et al.
5,732,950 A 3/1998 Moody
5,755,621 A 5/1998 Marks et al.
(Continued)

FOREIGN PATENT DOCUMENTS

WO WO 98/14250 4/1998
WO WO 98/52666 11/1998
(Continued)

*Primary Examiner* — Dmitry Suhol
*Assistant Examiner* — Carl V Larsen
(74) *Attorney, Agent, or Firm* — Neal, Gerber & Eisenberg LLP

(57) ABSTRACT

Various embodiments of the present disclosure are directed to a gaming system and method providing a video poker game with additional winning opportunities. Upon receiving a primary wager, the gaming system provides the player with a quantity of player cards. The gaming system enables the player to discard zero, some, or all of the player cards. The discarded cards are replaced. The player cards are compared to a paytable to determine an award, if any, won by the player. In addition to the player cards, the player is provided five card indicators. If one or more of the player cards matches with corresponding card indicators, then the player is provided an additional win opportunity.

29 Claims, 9 Drawing Sheets

(56) References Cited

U.S. PATENT DOCUMENTS

| | | | |
|---|---|---|---|
| 5,803,809 A | 9/1998 | Yoseloff | |
| 5,820,460 A | 10/1998 | Fulton | |
| 5,823,873 A | 10/1998 | Moody | |
| 5,833,536 A | 11/1998 | Davids et al. | |
| 5,882,259 A | 3/1999 | Holmes, Jr. et al. | |
| 5,911,418 A | 6/1999 | Adams | |
| 5,947,821 A | 9/1999 | Stone | |
| 5,957,774 A | 9/1999 | Holmes, Jr. et al. | |
| 6,007,066 A | 12/1999 | Moody | |
| 6,012,720 A | 1/2000 | Webb | |
| 6,050,568 A | 4/2000 | Hachquet | |
| 6,062,979 A | 5/2000 | Inoue | |
| 6,089,977 A | 7/2000 | Bennett | |
| 6,098,985 A | 8/2000 | Moody | |
| 6,120,031 A | 9/2000 | Adams | |
| 6,179,711 B1 | 1/2001 | Yoseloff | |
| 6,193,235 B1 | 2/2001 | Vancura et al. | |
| 6,196,547 B1 | 3/2001 | Pascal et al. | |
| 6,220,960 B1 | 4/2001 | Kryzhanovsky | |
| 6,227,969 B1 | 5/2001 | Yoseloff | |
| 6,251,013 B1 | 6/2001 | Bennett | |
| 6,311,976 B1 | 11/2001 | Yoseloff et al. | |
| 6,322,078 B1 | 11/2001 | Adams | |
| 6,334,613 B1 | 1/2002 | Yoseloff | |
| 6,346,043 B1 | 2/2002 | Colin et al. | |
| 6,406,023 B1 | 6/2002 | Rowe | |
| 6,419,578 B1 * | 7/2002 | Moody et al. | 463/13 |
| 6,439,993 B1 | 8/2002 | O'Halloran | |
| 6,457,715 B1 | 10/2002 | Friedman | |
| 6,461,240 B1 | 10/2002 | Perkins | |
| 6,494,454 B2 | 12/2002 | Adams | |
| 6,517,074 B1 | 2/2003 | Moody | |
| 6,517,432 B1 | 2/2003 | Jaffe | |
| 6,561,898 B2 | 5/2003 | Moody | |
| 6,568,680 B1 | 5/2003 | Moody et al. | |
| 6,599,185 B1 | 7/2003 | Kaminkow et al. | |
| 6,604,740 B1 | 8/2003 | Singer et al. | |
| 6,631,906 B1 | 10/2003 | Timpano | |
| 6,632,139 B1 | 10/2003 | Baerlocher | |
| 6,634,941 B2 | 10/2003 | Olive | |
| 6,652,377 B1 | 11/2003 | Moody | |
| 6,669,559 B1 | 12/2003 | Baerlocher et al. | |
| 6,672,959 B2 | 1/2004 | Moody et al. | |
| 6,729,961 B1 | 5/2004 | Millerschone | |
| 6,749,502 B2 | 6/2004 | Baerlocher | |
| 6,780,109 B2 | 8/2004 | Kaminkow | |
| 6,805,349 B2 | 10/2004 | Baerlocher et al. | |
| 6,855,053 B2 | 2/2005 | Baerlocher | |
| 6,866,583 B2 | 3/2005 | Glavich et al. | |
| 6,899,620 B2 | 5/2005 | Kaminkow et al. | |
| 6,905,406 B2 | 6/2005 | Kaminkow et al. | |
| 6,921,335 B2 | 7/2005 | Rodgers et al. | |
| 6,955,356 B2 | 10/2005 | Moody | |
| 6,964,416 B2 | 11/2005 | McClintic et al. | |
| 6,964,418 B2 | 11/2005 | Moody | |
| 6,991,538 B2 | 1/2006 | Cannon | |
| 6,994,624 B2 | 2/2006 | Gold et al. | |
| 7,040,983 B2 | 5/2006 | Dolloff et al. | |
| 7,048,275 B2 | 5/2006 | Adams | |
| 7,056,192 B2 | 6/2006 | Venigalla et al. | |
| 7,059,965 B2 | 6/2006 | Jackson | |
| 7,070,502 B1 | 7/2006 | Bussick et al. | |
| 7,074,127 B2 | 7/2006 | Cuddy et al. | |
| 7,090,580 B2 | 8/2006 | Rodgers et al. | |
| 7,094,148 B2 | 8/2006 | Baerlocher et al. | |
| 7,128,645 B1 | 10/2006 | White et al. | |
| 7,128,646 B2 | 10/2006 | Baerlocher et al. | |
| 7,137,628 B2 | 11/2006 | Moody | |
| 7,156,397 B2 * | 1/2007 | Moody et al. | 273/292 |
| 7,159,868 B2 | 1/2007 | Webb | |
| 7,160,188 B2 | 1/2007 | Kaminkow et al. | |
| 7,166,028 B2 | 1/2007 | Fasbender et al. | |
| 7,169,042 B2 | 1/2007 | Muir et al. | |
| 7,175,522 B2 | 2/2007 | Hartl | |
| 7,222,856 B2 | 5/2007 | Dodge | |
| 7,222,857 B2 | 5/2007 | Moody | |
| 7,237,775 B2 | 7/2007 | Thomas et al. | |
| 7,246,799 B2 | 7/2007 | Snow | |
| 7,247,092 B2 | 7/2007 | Jarvis et al. | |
| 7,297,057 B2 | 11/2007 | Gerrard et al. | |
| 7,331,866 B2 | 2/2008 | Rodgers et al. | |
| 7,354,344 B2 | 4/2008 | Paulsen et al. | |
| 7,377,514 B1 * | 5/2008 | Timpano et al. | 273/292 |
| 7,396,279 B2 | 7/2008 | Berman et al. | |
| 7,399,226 B2 | 7/2008 | Mishra | |
| 8,449,362 B2 | 5/2013 | Jackson | |
| 2002/0034974 A1 | 3/2002 | Wood et al. | |
| 2002/0052233 A1 | 5/2002 | Gauselmann | |
| 2003/0104851 A1 | 6/2003 | Merari | |
| 2003/0113517 A1 | 6/2003 | Imamura et al. | |
| 2003/0130024 A1 | 7/2003 | Darby | |
| 2003/0186737 A1 | 10/2003 | Bennett et al. | |
| 2004/0033827 A1 | 2/2004 | Gilmore et al. | |
| 2004/0048651 A1 | 3/2004 | Vorias et al. | |
| 2004/0053676 A1 | 3/2004 | Rodgers | |
| 2004/0186600 A1 * | 9/2004 | Tumacder et al. | 700/91 |
| 2005/0054421 A1 | 3/2005 | Hughs-Baird et al. | |
| 2005/0127606 A1 | 6/2005 | Snow et al. | |
| 2005/0148384 A1 | 7/2005 | Marks et al. | |
| 2005/0202863 A1 | 9/2005 | Macaulay | |
| 2005/0239527 A1 | 10/2005 | Moody | |
| 2005/0242505 A1 * | 11/2005 | Reiner et al. | 273/292 |
| 2005/0269775 A1 * | 12/2005 | Sorge | 273/274 |
| 2005/0288090 A1 | 12/2005 | Thomas et al. | |
| 2006/0040721 A1 | 2/2006 | Cuddy et al. | |
| 2006/0052148 A1 | 3/2006 | Blair, Jr. et al. | |
| 2006/0063578 A1 | 3/2006 | Bansemer et al. | |
| 2006/0063584 A1 | 3/2006 | Brill et al. | |
| 2006/0066050 A1 * | 3/2006 | Sorge | 273/292 |
| 2006/0066051 A1 | 3/2006 | Nicely | |
| 2006/0068875 A1 | 3/2006 | Cregan | |
| 2006/0073876 A1 | 4/2006 | Cuddy | |
| 2006/0084494 A1 | 4/2006 | Belger et al. | |
| 2006/0089191 A1 | 4/2006 | Singer et al. | |
| 2006/0131809 A1 | 6/2006 | Lancaster et al. | |
| 2006/0131810 A1 | 6/2006 | Nicely | |
| 2006/0154714 A1 | 7/2006 | Montross et al. | |
| 2006/0246977 A1 | 11/2006 | Cannon | |
| 2006/0267283 A1 | 11/2006 | Jackson | |
| 2006/0284378 A1 | 12/2006 | Snow et al. | |
| 2006/0287034 A1 * | 12/2006 | Englman et al. | 463/13 |
| 2007/0026920 A1 | 2/2007 | Flint et al. | |
| 2007/0054721 A1 | 3/2007 | Jackson | |
| 2007/0060241 A1 | 3/2007 | Low et al. | |
| 2007/0060248 A1 | 3/2007 | Rodgers et al. | |
| 2007/0117604 A1 * | 5/2007 | Hill | G07F 17/32<br>463/16 |
| 2007/0135193 A1 | 6/2007 | Nicely | |
| 2007/0135194 A1 | 6/2007 | Nicely | |
| 2007/0228656 A1 | 10/2007 | Jackson | |
| 2008/0020846 A1 | 1/2008 | Vasquez et al. | |
| 2008/0026806 A1 | 1/2008 | Gold et al. | |
| 2008/0113704 A1 * | 5/2008 | Jackson | 463/13 |
| 2008/0113816 A1 * | 5/2008 | Mahaffey et al. | 463/42 |
| 2008/0167105 A1 | 7/2008 | Kaminkow | |
| 2010/0210334 A1 * | 8/2010 | Crawford et al. | 463/13 |
| 2010/0216533 A1 * | 8/2010 | Crawford et al. | 463/11 |
| 2012/0231863 A1 * | 9/2012 | Stromer | 463/13 |

FOREIGN PATENT DOCUMENTS

| | | |
|---|---|---|
| WO | WO 00/66235 | 11/2000 |
| WO | WO 00/32286 | 6/2006 |

* cited by examiner

300

GAMING SYSTEM AND METHOD PROVIDING A VIDEO POKER GAME WITH POSITIONAL MATCHING CARD WINNING OPPORTUNITIES

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

In recent years, poker has become very popular. One of the most common variations of poker is the Five Card Draw poker game. In general, in Five Card Draw poker the player gets five cards dealt face up from a 52 card deck of playing cards. The player can discard none, one, a plurality or all of the five cards. Each discarded card is replaced with another card from the deck. This is called the draw. After the replacement, the cards are evaluated for winning combinations. For a five card poker game, there are ten general categories of hands, ranked from highest to lowest, as shown in Table 1 below.

TABLE 1

Ranking of Five Card Poker Hands by Category

| Rank | Name | Example |
|---|---|---|
| 1 | Royal Straight Flush | A♣K♣Q♣J♣10♣ |
| 2 | Straight Flush | K♣Q♣J♣10♣9♣ |
| 3 | Four of a Kind | J♣J♥ J♦ J♠3♣ |
| 4 | Full House | A♥ A♦ A♣6♦ 6♣ |
| 5 | Flush | A♣J♣8♣6♣2♣ |
| 6 | Straight | 8♦ 7♣6♠5♠4♣ |
| 7 | Three of a Kind | Q♠Q♥ Q♦ 6♦ 2♠ |
| 8 | Two Pair | 8♦ 8♥ 5♥ 5♣2♠ |
| 9 | One Pair | K♦ K♠8♣7♣2♥ |
| 10 | High Card | A♥ 10♣7♦ 5♠3♠ |

Within each category, hands are ranked according to the rank of individual cards, with an Ace being the highest card and a two being the lowest card. There is no difference in rank between the four suits of cards. All hands can be ranked in a linear ranking from highest to lowest. Because suits are all of the same value, however, there are multiple hands that have identical rankings. For example, there are four equivalent hands for each type of straight flush, four of a kind, or flush. There are over a hundred equivalent hands for each two pair variation, and there are over 1,000 equivalent hands for each type of no-pair hand.

Numerous variations of poker exist, including Five Card Draw as mentioned above, Three Card Poker, Five Card Stud, Seven Card Stud, Hold'em (also called Texas Hold'em), Omaha (also called Omaha Hold'em), and Pai-Gow Poker. The variations in these games generally differ in the manner in which cards are dealt and in the manner and frequency in which bets are placed. Various criteria may also be used to determine the winning hand, including highest ranking hand, lowest ranking hand (Low-Ball), and where the high and low hands each win half of the pot (High-Low).

Variations of Five Card Draw such as the Deuces Wild game and the Choose Your Wild game provide the player with additional winning opportunities by enabling certain cards to act as wild cards. In the Deuces Wild game, cards with the face value two of any suit are wild and substitute for any other card in the deck. With the Choose Your Wild game, the player can nominate any face value of the 13 different face values to be wild. Cards having the nominated face value are then wild and substitute for any other card in the deck, regardless of the suit. In both of these variations, a single predetermined face value acts as a wild card during the play of the game. The wild cards in these variations substitute for any other card to provide the player with the best hand possible. Further, the wild card substitutes regardless of the position at which it is displayed. When wild cards are dealt to the player, it increases the chances of the player winning. Therefore, these games modify the pay table in order to account for the higher probability of winning. For example, some Deuces Wild games do not provide an award for a single pair and even a two pair card combination. A player has to have at least a three of a kind or better (see Table 1 above) in order to win an award.

Although these variations add excitement to the standard draw poker game play, there is typically no variation in the wild cards for each play. The wild card in these variations is typically a single preset card or multiple preset cards. Further, the wild card typically substitutes regardless of the position among the five cards, at which it is displayed. Further, upon the occurrence of a designated wild card during game play, the event that triggers is typically the substitution of that wild card for any other card to provide an enhanced opportunity for the player to win an award. The occurrence of the wild card does not guarantee that the player will win an award. Therefore, a need exists to provide additional variations in video poker games that provide wild cards to the player in a more dynamic manner and enables additional win opportunities.

SUMMARY

Various embodiments of the present disclosure are directed to a gaming system and method providing a video poker game with additional win opportunities. In one embodiment, the gaming system receives a wager from a player and displays five player cards randomly selected from a deck of 52 virtual playing cards. In addition, one to five card indicators are displayed to the player. Each card indicator is displayed at a card indicator position that corresponds with each player card. If any player card matches the card indicator in the corresponding card indicator position, then the player is eligible for an additional win opportunity. The player can then hold one, some, or all of the player cards. The discarded player cards are replaced by randomly selected cards from the remaining cards in the deck of playing cards. The gaming system then determines if there is a match for the newly selected player cards and the card indicators in the corresponding card indicator positions.

If there is a match, the gaming system provides an additional win opportunity to the player. In various embodiments, the additional win opportunity includes one or more of the following: (i) the matching player card becoming a wild card and the gaming system evaluating the player cards with the wild cards; (ii) the player being provided a multiplier for each matching card; (iii) the player being provided a bonus round whereby the player may win additional awards; and (iv) a feature being provided to the player for a quantity of subsequent plays of the game.

In various embodiments, the gaming system displays the card indicators to the player prior to the receipt of a wager by the player.

In various embodiments, all of the quantity of card indicators are predetermined and are the same for all plays of the game on the gaming system. For instance, the player may choose to play the Diamond Royals game that has five card indicators which are the ace, king, queen, jack and ten of diamonds.

In various other embodiments, all of the quantity of card indicators are selected by the player prior to the play of the game. That is, the player is able to select the face and suit of each of the card indicators prior to the play of the game. The player selected card indicators are then displayed in the card indicator positions for each play of the game until the player changes the card indicators again.

In various embodiments, less than all of the quantity of card indicators are predetermined by the gaming system and the remaining quantity of card indicators are selected by the player prior to the play of the game. For instance, the gaming system is configured to display five card indicators, of which two are predetermined and the remaining three are selected by the player prior to the play of the game. In certain of these embodiments, the positions at which the card indicators are displayed are predetermined. In various other embodiments, the position for each card indicator is randomly determined for each play of the game.

In various embodiments, a match occurs when the rank, the suit, or both rank and suit of a player card matches or corresponds to the card indicator in the corresponding card indicator position.

It should thus be appreciated that the gaming system and method of the present disclosure provide new and different video poker games, thereby increasing player enjoyment, entertainment, and excitement.

Additional features and advantages are described herein, and will be apparent from, the following Detailed Description and the Figures.

DETAILED DESCRIPTION

Video Poker Game

Figure 1:
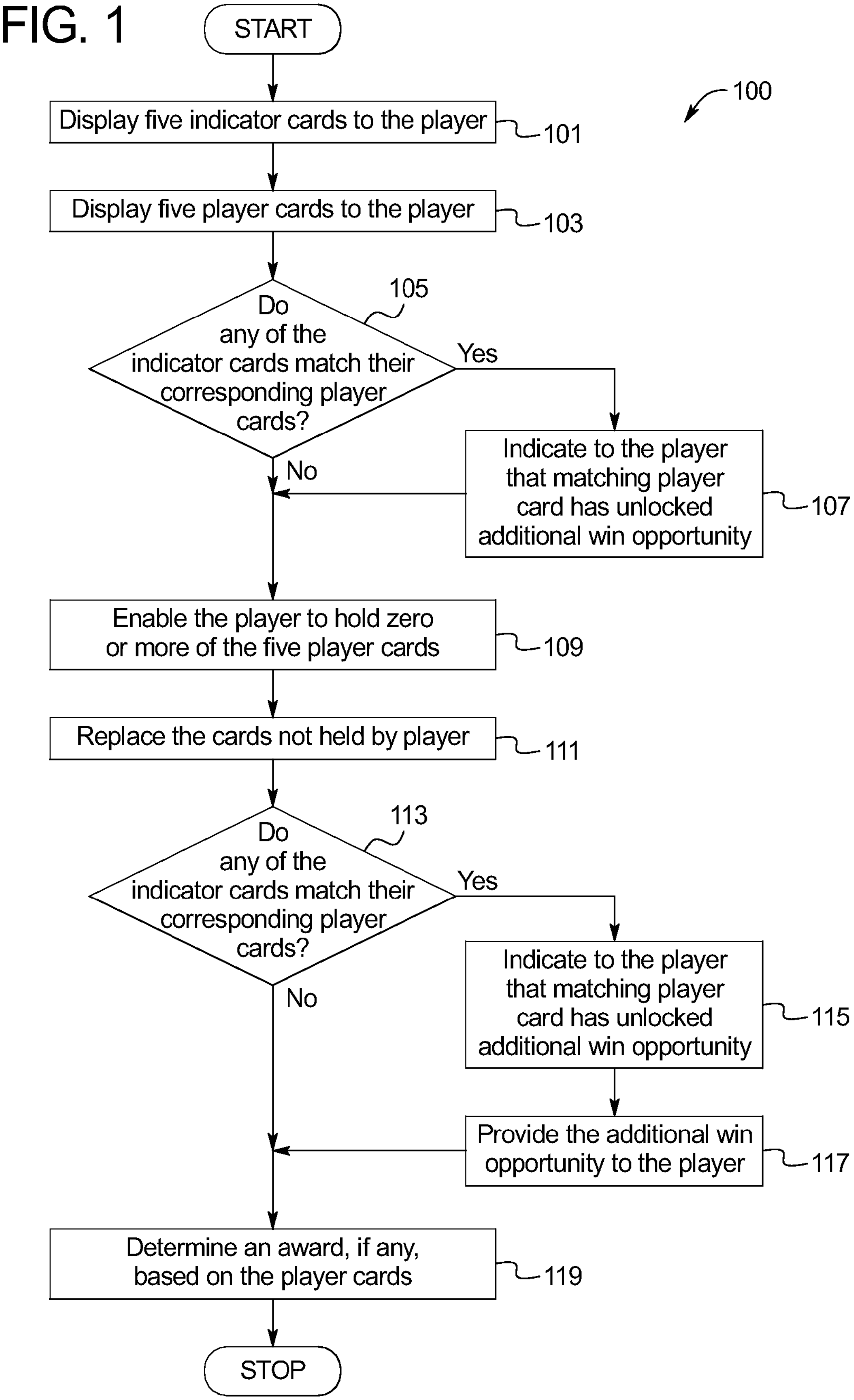
FIG. 1 is a flowchart illustrating a method of operating an example embodiment of a gaming system of the present disclosure.

Various embodiments of the present disclosure are directed to a gaming system and method providing a video poker game with additional win opportunities. In certain embodiments, the gaming system receives a bet from a player and displays five player cards to the player. The player cards are randomly selected from one or more standard decks of 52 playing cards. Each player card has a corresponding card indicator position where the card indicators are displayed. The gaming system also displays five card indicators, or representations thereof, in card indicator positions. The gaming system enables the player to hold zero, some, or all of the five player cards. The player cards that are not held are discarded and are replaced by other cards randomly selected from the one or more decks of standard playing cards and the gaming system evaluates whether the player won an award based on the five player cards. If any of the player cards match the card indicators in their corresponding card indicator positions, then the gaming system provides an additional win opportunity to the player.

In various embodiments, the additional win opportunity includes the matching player card turning wild for the play of the game, providing a multiplier, providing a bonus game or feature to the player, and unlocking game features for the current or future play of the video poker game. In various embodiments, if more than one of the player cards match the respective card indicators in their corresponding card indicator positions, then more than one additional win opportunity is provided to the player in certain embodiments.

While the video poker game of the present disclosure is employed as a primary game in the embodiments described below, it should be appreciated that the video poker game may additionally or alternatively be employed as or in association with a bonus game or a secondary game. Moreover, while any credit balances, any wagers, and any awards are displayed as an amount of monetary credits or currency in the embodiments described below, one or more of such credit balances, such wagers, and such awards may be for non-monetary credits, promotional credits, and/or player tracking points or credits.

In various embodiments, the card indicators are selected by the player before the play of the game. For example, gaming system provides a user interface to the player to select five playing cards to be used as card indicators for the play of the video poker game. These card indicators do not change for subsequent plays of the video poker game of the gaming system, unless the player activates the user interface to change the card indicators.

In various other embodiments, the card indicators are provided by the gaming system in a predetermined manner. For example, the player may play a Wild Diamond Royals game, where the card indicators are predetermined to be the ace, king, queen, jack and ten of diamonds. In these embodiments, the predetermined card indicators are displayed at the card indicator positions corresponding to the position that the player cards will be displayed when dealt. For example, the ace of diamonds card indicator is displayed at the card indicator position corresponding to the left most card and the other card indicators in sequence such that the ten is displayed at the card indicator position corresponding to the right most player card. Multiple such variations are possible, such as the All Deuces Wild game, where the two of diamonds, hearts, spades and clubs are four of the five card indicators and the fifth card is selected by the player prior to the play of any game, is predetermined by the gaming system, or randomly selected.

The card indicators may be displayed by the gaming system in a variety of different manners such as displaying portions thereof, representations of card indicators, or the rank and suit of the card indicators in the card indicator positions. For example, the gaming system may display a card indicator above or below the player card, in a size different than the player card. Alternatively, the gaming system may display the rank and suit of the card indicator without displaying a card above or below the player cards. The card indicators, portions thereof, representations of card indicators, or the rank and suit of the card indicators may also be superimposed over the player cards.

FIG. 1 is a flowchart illustrating a method of operating an example embodiment of a gaming system of the present disclosure. In various embodiments, process 100 is represented by a set of instructions stored in one or more memories and executed by one or more processors. Although process 100 is described with reference to the flowchart shown in FIG. 1, it should be appreciated that many other processes of performing the acts associated with this illustrated process 100 may be employed. For example, the order of certain of the illustrated blocks and/or diamonds may be changed, certain of the illustrated blocks and/or diamonds may be optional, and/or certain of the illustrated blocks and/or diamonds may not be employed.

The gaming system is configured to begin the play of a video poker game upon receiving a wager for the play of the game from a player. The gaming system then displays five card indicators and five player cards to the player simultaneously, or nearly simultaneously, as indicated by blocks 101 and 103. The five player cards are displayed at unique positions on the display device. In certain embodiments, the player cards are arranged horizontally from left to right on the display device. The card indicators are displayed in card indicator positions, which respectively correspond to the positions at which player cards will be dealt. The card indicators are displayed in a manner to distinguish them from the player cards so that there is no confusion for the player. The player cards are randomly drawn from one or more decks of playing cards and displayed to the player. The card indicators are displayed according to one of the embodiments of the present disclosure, described in detail below. The gaming system determines if any of the card indicators match their corresponding displayed player cards, as indicated by block 105.

In various embodiments, a match occurs when both the rank and suit of a card indicator is the same as the rank and suit of the player card displayed in the corresponding position. In some embodiments, a match occurs when either the rank or the suit of the card indicator is the same as the rank or the suit of the player card displayed in the corresponding position. In some other embodiments, a match occurs when the rank, suit, or both rank and suit of a card indicator match that of a player card regardless of the positions of the indicator and player cards.

In various embodiments, if there is no match between a player card and the card indicator displayed in the corresponding position, but a player card matches a card indicator displayed in a position that does not correspond with the player card, then the gaming system enables the player to switch either the player cards or the card indicators such that the matching player card and the card indicator are in corresponding positions. In various different embodiments, these switches are earned, bought by, awarded to, or otherwise provided to the player.

If there is a match, for each displayed player card that is matched with its corresponding card indicator the gaming system indicates to the player that there is a match, as indicated by block 107. The gaming system also displays to the player a message informing the player about the player obtaining an additional win opportunity. In various embodiments, the additional win opportunity is provided to the player before proceeding with the play of the game. In various other embodiments, the additional win opportunity is deferred and provided to the player after the player completes the play of the game, and in conjunction or prior to providing any awards, as indicated by blocks 109 and 111. In certain embodiments, the additional win opportunity is provided as part of the play of the game.

In certain of these embodiments, the gaming system determined whether to provide an additional win opportunity based on the cards held by the player. That is, if the player discards the card that provides the additional win opportunity, then the additional win opportunity may not be provided to the player. For example, if the player discards a player card that corresponds to an additional win opportunity, then the player may not be provided the additional win opportunity, unless the replacing card also qualifies the player for the additional win opportunity. In certain embodiments, the message indicates to the player that the player may be eligible for an additional win opportunity, pending the final play of the game by the player. In various embodiments, the gaming system disables the player from discarding a player card that provides an additional win opportunity. In various other embodiments, the gaming system displays a warning message when the player discards a player card that provides an additional win opportunity to the player.

The gaming system enables the player to hold zero, some or all of the cards in the player hand, as indicated by block 109. The gaming system receives player input in one or more ways. Examples of receiving player input include receiving input from a touch screen at an EGM, such that the player touches one of the five cards on the touch screen enabled EGM. In one example, the EGM has physical buttons or buttons that are displayed by an electronic display device configured to correspond to each of the five cards. The player touches the physical button corresponding to the player card to be held. Alternate embodiments provide for the player to touch the player cards or activate the buttons corresponding to the player hands that player wishes to hold. Certain embodiments further enable the player to confirm player choice to hold or discard player cards by a deal, draw, accept or similar input. In one embodiment, the layout of the physical buttons corresponds to the player cards. As an illustration, the left most button corresponds to the left most player card displayed on the screen, and so on. In other embodiments, the player is provided a touch enabled panel instead of physical buttons. In other embodiments, the player can move a mouse to position a pointer over the player hand to be discarded or type a keyboard key corresponding to the player hand to be discarded. Alternate embodiments enable a player to move a mouse to position a point over player cards to be held or type keyboard keys corresponding to the player cards to be held.

The gaming system replaces the discarded player cards with different cards randomly drawn from the same one or more decks of remaining playing cards from which the original five player cards were drawn, as indicated by block 111. The replaced cards are displayed to the player in the respective card positions. The gaming system makes the determination if there is a match between the player cards and the corresponding card indicators, as indicated by block 113. If there is a match between one or more player cards and their corresponding card indicators, then the gaming system displays a message indicating to the player that there is a match, as indicated by block 115. The gaming system then provides the additional win opportunity to the player, as indicated by block 117. If there is no match, or after providing the win opportunity to the player as indicated by block 117, the gaming system determines an award, if any, to be provided to the player, as indicated by block 119. The award to be provided to the player is based on a ranking of the hand formed by the five player cards. In various embodiments, the additional win opportunity, if any, is used during or for the play of the game to modify the award that is to be provided to the player for the play of the game.

The award to be provided to the player is determined by comparing the five player cards, with or without the additional win opportunity, with a paytable, such as Table 1 above, which further includes the amount of credits to be provided to the player based on the hand formed by the player cards. In various embodiments, the gaming system uses multiple paytables, and determines which of these multiple paytables to use based on the amount wagered by the player. This concludes the play of the game. Another play may be initiated upon receipt of another wager from the player.

In various embodiments, the gaming system enables the player to select the five cards to be used as card indicators before the play of each game. The gaming system displays an interface before the play of a game whereby the player can input each of the five card indicators. Alternate ways of selecting the card indicators are possible, in accordance with the present disclosure, such as the player operating a touch enabled display device that displays 52 cards and the player touching the display areas of the five cards to be selected. Alternatively, the touch enabled display device displays the thirteen different ranks and then the four different suits in a two-step approach to enable the player to select each of the five card indicators. In various embodiments, once a player selects the card indicators to be used for a play of the game, the same cards are used for additional plays until the player takes certain steps to change the card indicators. When the player does so, for example, by selecting an option such as Change Card Indicators, the newly selected card indicators are used for subsequent plays of the game.

In certain embodiments, the gaming system enables the player to select a card indicator position for each card indicator. The positions correspond to the position of the five player cards that will be dealt for the play of the game. For example, card indicator 1 corresponds to player card 1; card indicator 2 corresponds to player card 2, and so on. When the player selected card indicator is displayed to the player, the card indicator is displayed corresponding to the card indicator position specified by the player. In other embodiments, the gaming system does not enable the player to select positions for the card indicators. In certain of these embodiments, the gaming system randomly selects a position for each of the card indicators for each play of the game or for a play session that is either predetermined or defined by the player (such as 5 plays, 10 plays, etc.). In other embodiments, the card indicators are always the same. In other embodiments, the card indicators change based on a suitable rotation of sets of card indicators.

Figure 2:
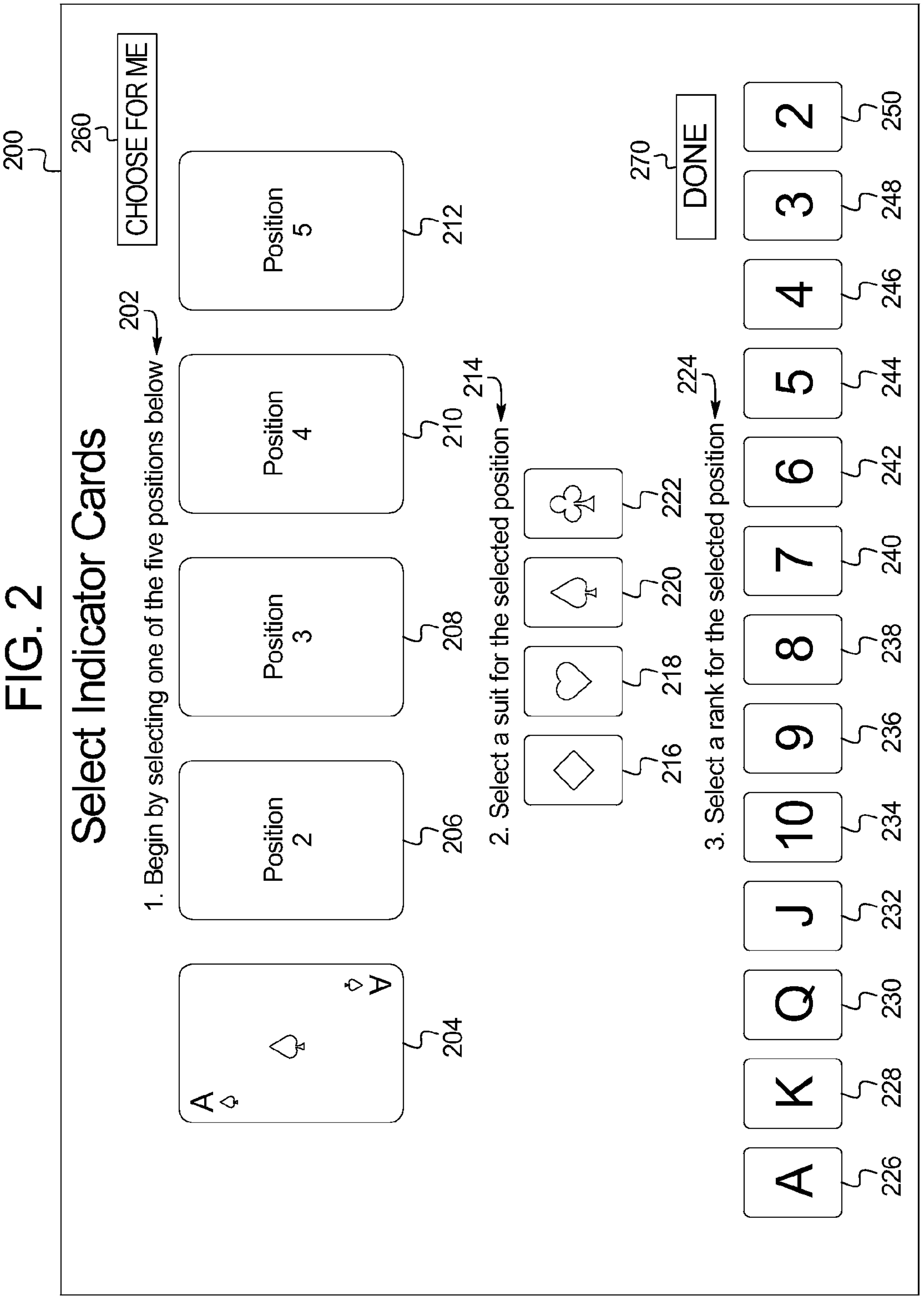
FIG. 2 illustrates a screen of the gaming system of the present disclosure operating an example embodiment of a gaming system of the present disclosure.

FIG. 2 illustrates a screen of the gaming system of the present disclosure operating an example embodiment of a gaming system of the present disclosure whereby a player can select the five cards to be used as card indicators. In this embodiment, the gaming system presents a display as shown the screen 200 of FIG. 2 when the player begins a play session, or anytime during a game play session by selecting a Change Card Indicators or similar option. The screen shows five positions that display the currently selected card indicators, positions 204, 206, 208, 210, and 212. When the player first begins play of the game, there are no currently selected card indicators, and the positions are empty, such as shown in positions 204, 206, 208, 210, and 212. If the player chooses to change card indicators, the screen shows the positions populated with currently selected card indicators, such as shown at position 204. The player is prompted to first select a position for which the player wishes to change and/or select a card indicator, as shown by message 202. The gaming system receives player input indicative of the position for which the card indicator is to be selected. Next, the gaming system prompts the player to select one of four suits, as shown in message 214. The player can select one of the four suits displayed at 216, 218, 220, or 222. The gaming system receives player input indicative of the suit selected by the player.

The gaming system then prompts the player to select a rank corresponding to the suit for the card indicator, as shown in message 224. The player can select one of the thirteen ranks displayed at 226, 228, 230, 232, 234, 236, 238, 240, 242, 244, 246, 248, or 250. The gaming system receives player input indicative of a rank selected by the player. This rank and suit is then displayed at the position selected by the player. In this example, the player selects the ace of spades for position 1 by first selecting position 1 (204) and then selecting the spades option (220) and then selecting the ace (226). The ace of spades is then displayed at position 1 (204). In this manner, the gaming system enables the player to select the other card indicators.

In this embodiment, if the player tries to select a card as a card indicator that is currently selected at a different position, the gaming system informs the player accordingly and asks the player to select a different card. This embodiment also enables the player to have the gaming system select the card indicators, whereby, the player can select the Choose For Me button 260, and the gaming system randomly selects five cards from the deck of 52 cards to act as the card indicators. If the player is not satisfied with one or more of the randomly selected cards, then the player can change those one or more cards by completing the process as described above or select the Choose For Me button 260 to receive a new set of randomly selected card indicators. Once the player is satisfied with the selection of the card indicators, the player can select the Done button 270 and return to the game play screen. It should be appreciated that this random features aids in the selection of the card indicators and that the selection of card indicators is used for a plurality of game plays, until the player decides to obtain a different set of card indicators.

Figure 3A:
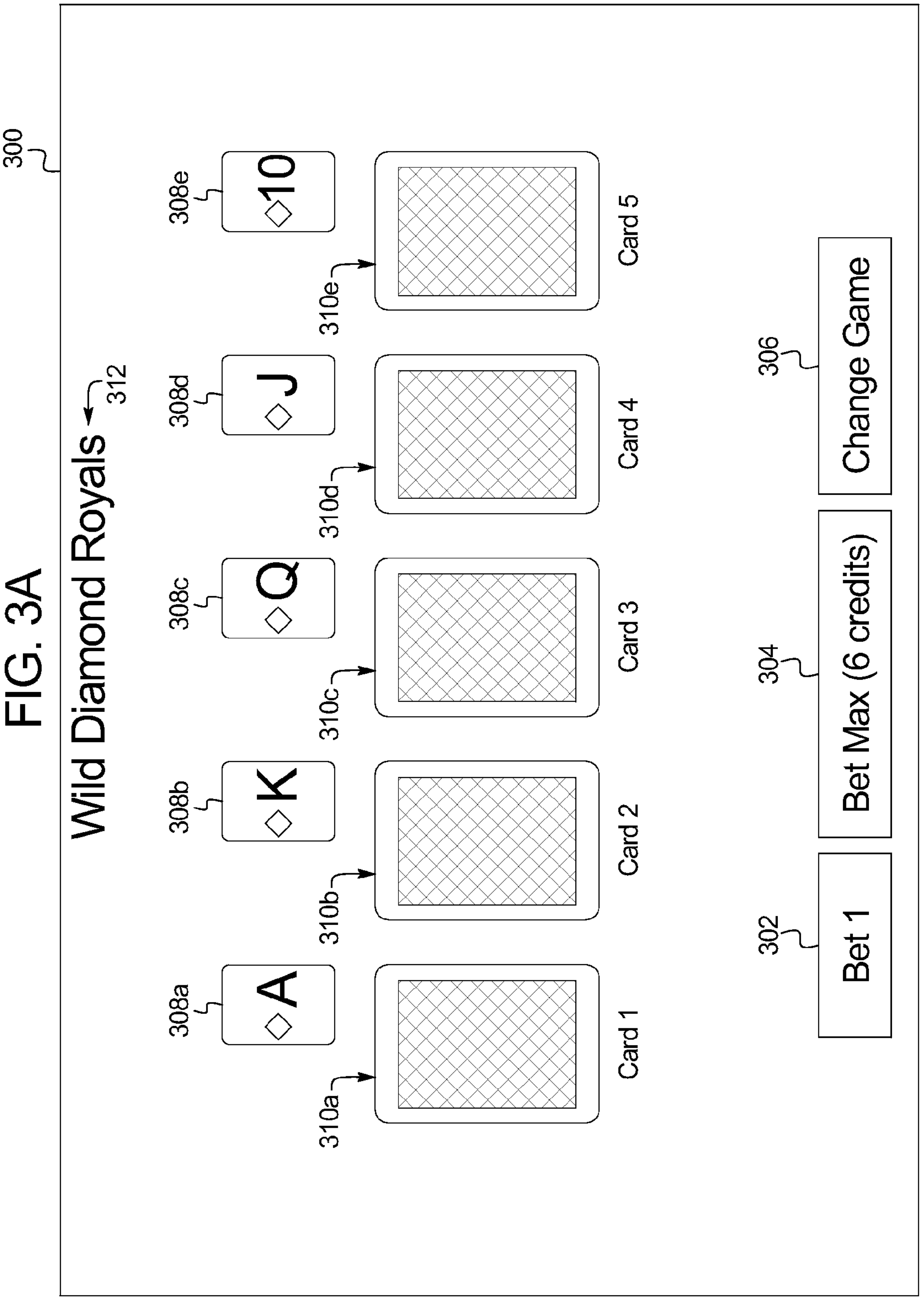
FIGS. 3A, 3B, and 3C illustrate screens of the gaming system of the present disclosure operating an example embodiment of a gaming system of the present disclosure.
Figure 3B:
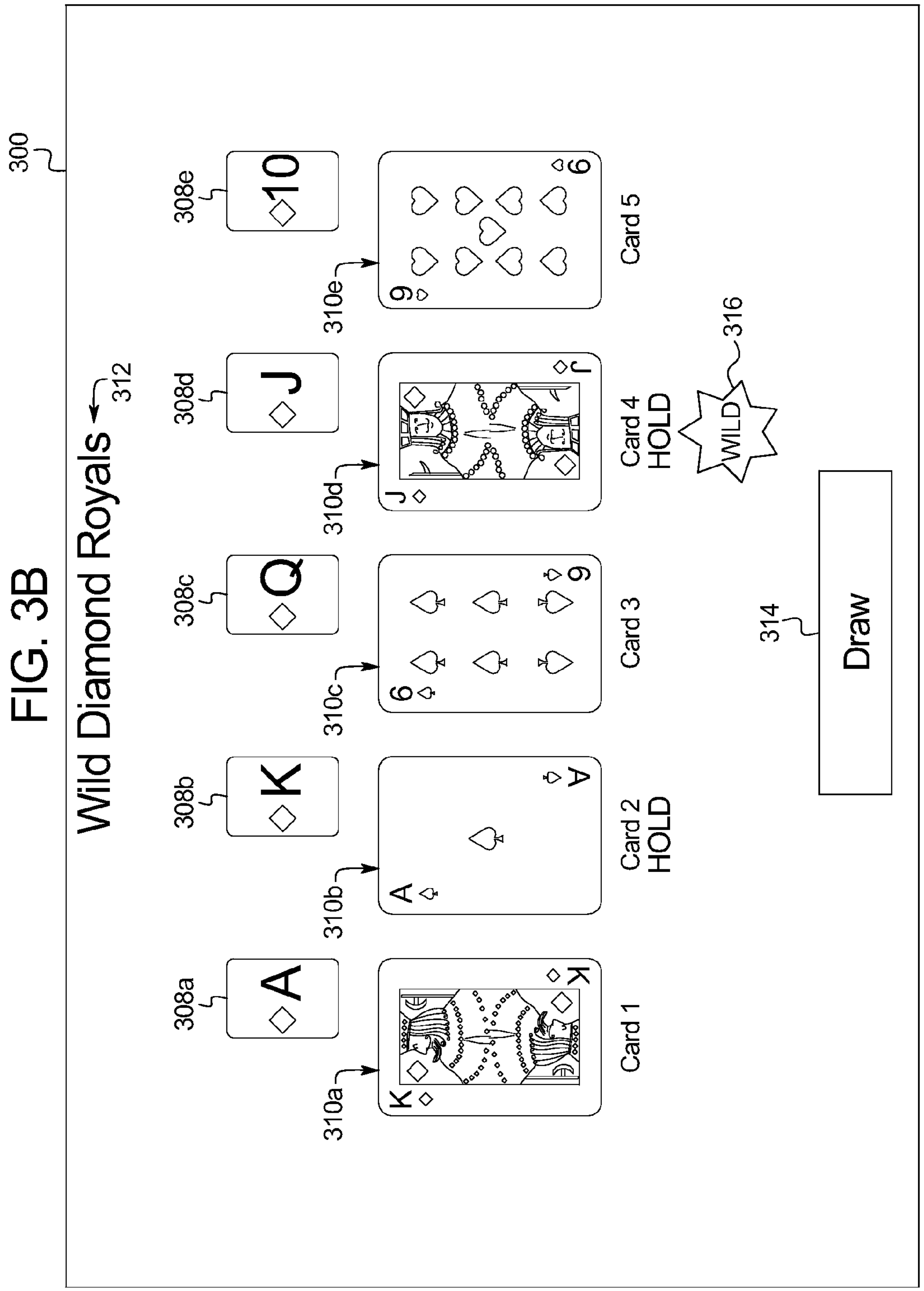
Figure 3C:
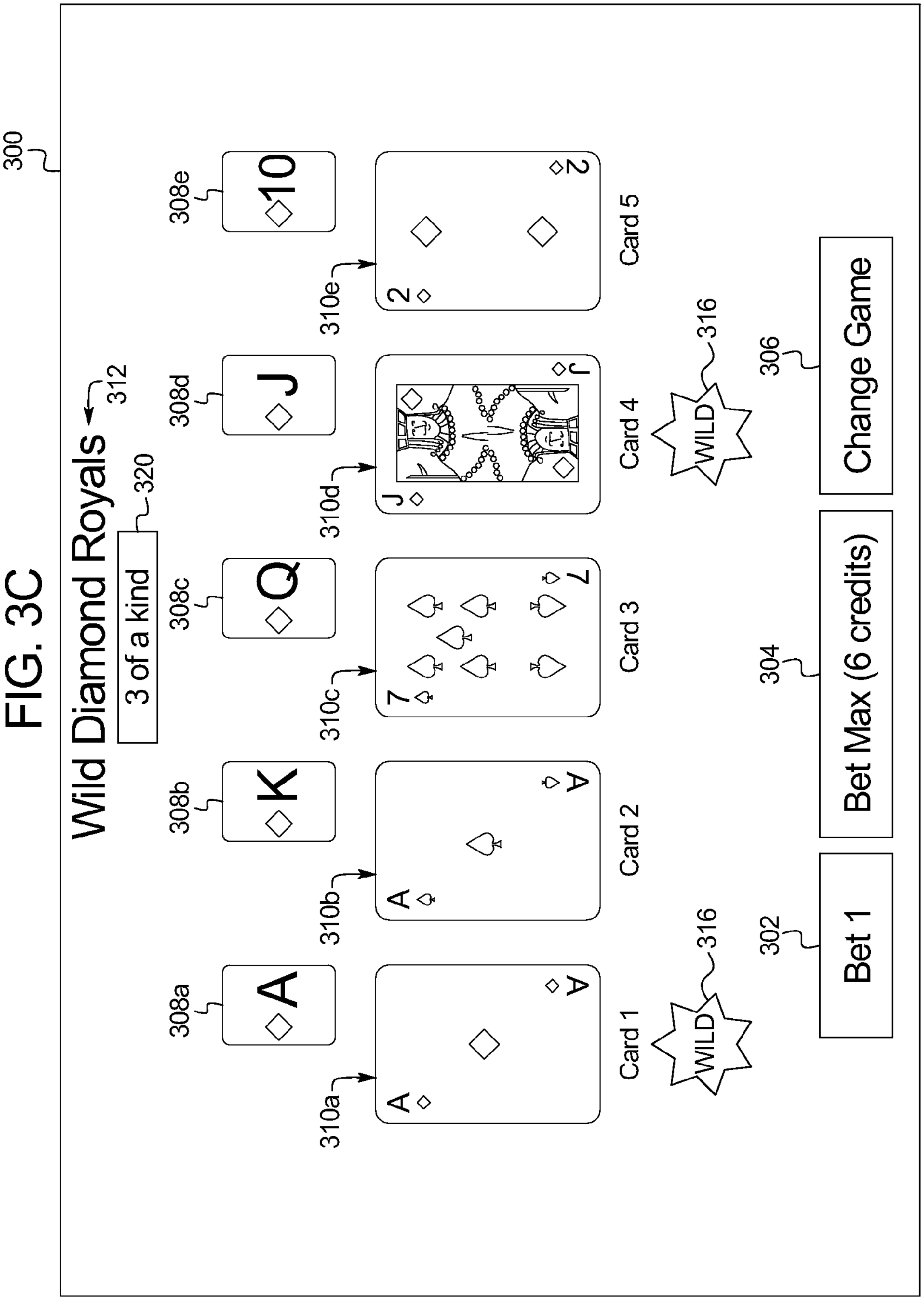

FIGS. 3A, 3B, and 3C illustrate screens of the gaming system of the present disclosure operating an example embodiment of a gaming system of the present disclosure. This example embodiment is one of the various embodiments in which the card indicators are predetermined by the gaming system. In this embodiment, the player chooses to play the Wild Diamond Royals game. In this game, the card indicators are the ace, king, queen, jack and ten of diamonds. These do not change with any single play of the game. However, in some other embodiments, the gaming system randomly determines the position at which each of the five card indicators will be displayed for each play of the game. In the embodiment described in FIGS. 3A, 3B, and 3C, the positions are also predetermined and do not change with the play of the game. That is, in this Wild Diamond Royals game embodiment, the ace is always displayed at the left most position and the card indicators are displayed in descending order from left to right.

This screen also shows various game buttons such as the Bet 1 button 302, the Bet max button 304 and the Change Game button 306. The gaming system prompts the player to begin play by enabling the player to select either the bet 1 button 302 or the bet max button 304. It should be apparent that various other betting configurations are possible whereby the player may be enabled to select the amount of money or the quantity of credits to bet. The player may also choose the pick a different game by selecting the change game button 306. The gaming system displays the five card indicator positions 308*a*, 308*b*, 308*c*, 308*d*, and 308*e*. Also displayed are the five player card positions 310*a*, 310*b*, 310*c*, 310*d*, and 310*e*.

The gaming system receives player input indicative of the bet 1 button 302, bet max button 306 or the change game button 306 selected by the player. If either button 302 or 304 is selected, then the gaming system proceeds with game play. If button 306 is selected, then gaming system presents the player with a list of games available to play. This may include various embodiments of the present disclosure as well as other known variations of video poker or other games.

Once the gaming system receives an indication that the player has placed a bet, the gaming system displays the card indicators in card positions 308*a*, 308*b*, 308*c*, 308*d*, and 308*e*. In certain other embodiments, the card indicators are displayed prior to the receipt of a wager by the gaming system. Some of these embodiments have predetermined card indicators, such as the Wild Diamond Royals game described above. Further, the gaming system displays the five player cards in player card positions 310*a*, 310*b*, 310*c*, 310*d*, and 310*e*. In this embodiment, card indicators are preselected and are displayed to the player. The five player cards are selected randomly from a single deck of 52 playing cards. In this example, the king of diamonds is displayed at position 1 (310*a*), the ace of spades at position 2 (310*b*), the six of spades at position 3 (310*c*), the jack of diamonds at position 4 (310*d*), and the nine of hearts at position 5 (310*e*), as indicated in FIG. 3B. The gaming system evaluates if there is a match between the player cards and their corresponding card indicators to determine whether to provide the player with an additional win opportunity. Here, the jack of diamonds in position 4 (310*d*) matches the jack of diamonds in card indicator position 308*d*, therefore there is a match. The gaming system informs the player of the match and the provided additional win opportunity by wild message 316.

To continue play, the player can hold zero, some, or all of the player cards. The gaming system receives player input indicative of the player cards held by the player. In this example, player chooses to hold player cards in card position 2 (310*b*) and card position 4 (310*d*). The other three player cards in card positions 310*a*, 310*c*, and 310*e* are discarded by the gaming system and replaced by three randomly selected other cards from the same deck. In this example, the ace of diamonds is randomly selected by the gaming system for player card position 1 (310*a*), the seven of spades for player card position 3 (310*c*) and the two of diamonds for player card position 5 (310*e*). The gaming system evaluates if there is a match between the player cards and their corresponding card indicators to determine whether to provide the player with an additional win opportunity. Here, the jack of diamonds in player card position 4 (310*d*) previously matched the jack of diamonds in card indicator position 308*d*, and the player held that card, therefore the match continues. Further, the ace of diamonds at player card position 1 (310*a*) matches with the ace of diamonds in the card indicator position 1 (308*a*), therefore there is a second match. The gaming system informs the player of the matches and the provided additional win opportunities by wild messages 316 and 318.

In this embodiment, the additional win opportunities are provided in the form of wild cards to the player. The gaming system provides the additional win opportunities prior to the completion of game play and before the award for the player hand, if any, is determined. Here, the jack of diamonds in player card position 4 (310*d*) is wild and substitutes for an ace to form a hand with three cards of a kind. This hand is evaluated against a paytable and any wins provided to the player. The gaming system determines that card to be substituted to maximize the award, if any, to be provided to the player. The gaming system displays a message 320 indicating to the player that the player hands forms a three of a kind and provides the appropriate award. This concludes the play of the game in accordance with this example embodiment of the present disclosure. The player may play another play of the game by placing another wager and the steps outlined above are repeated.

It should be appreciated that there are different ways of providing an additional win opportunity in accordance with the present disclosure, including, but not limited to, wild cards, multipliers, feature unlocks such as a fever mode, and bonus games. As described in the example embodiment above, when the additional win opportunity is in the form of a wild card, the matching card substitutes for any other card in the deck of cards such that the player can win the best possible award based on the paytable given the other player cards dealt to the player. In the above embodiment, the player hand included three non-wild cards, the ace of spades, the seven of spades and the two of diamonds. The player had two cards each of which provided a wild additional win opportunity. Using the example paytable in Table 1, it would not have been possible to form a royal flush, a straight flush, four of a kind, full house, flush, or straight by substituting the two wild cards for any card in the deck. Therefore, the best possible hand that could be formed is a three of a kind, in which the jack of diamonds is used as an ace of either clubs or hearts.

In certain embodiments, the additional win opportunity is a multiplier. In certain of these embodiments, the multiplier is applied to the award, if any, provided to the player upon evaluation of the player cards. In some of these embodiments, the multiplier value is based on the face value of the player card that matches the card indicator. For example, if the player card that matches the card indicator has a rank of three, then the multiplier that will be used to multiply the award value, if any, will be three. Cards having non numerical ranks such as king, queen, jacks, and aces are assigned predetermined or randomly determined multiplier values.

In certain of these embodiments, the value of the multiplier is based on the quantity of player cards matching the card indicators. In one such embodiment, a match occurs when the rank and suit of a player card matches the rank of suit of a card indicator, regardless of the position of the player card and the card indicator. In this embodiment, the additional win opportunity is provided as a multiplier. The value of the multiplier is two times the number of matches. If there is one player card that matches any of the card indicators, then the player is provided a 2× multiplier. If there are two matching player cards, then the player is provided a 4× multiplier, as so on. In various other embodiments, the played is provided a 1× multiplier for each matching player card. Therefore, if there are two player cards that match their corresponding card indicators, the player is provided with a 2× multiplier. In various embodiments, the multiplier may be a combination of the above described embodiments whereby it is based on both the matching card rank and the number of matching cards.

In some embodiments, the additional win opportunity is provided as a bonus round. In various embodiments, the additional win opportunity is provided as a fever mode. In the fever mode, the player is provided certain features that were not available to the player in the normal mode of play. The fever mode is usually provided for plays of the game that occur after the play in which it is provided. That is, the gaming system provides a predetermined quantity of plays of the game with the feature after the completion of the current play of the game. One embodiment of this fever mode is with additional wilds. In this embodiment, when the player card matches a card indicator, fever wild mode is enabled for a predetermined quantity of future plays, for example, two plays. The next two plays of the game, upon placement of a wager for each of the two plays, are provided to the player whereby the matching player card is wild for the future two plays. For example, if the player card that matches a card indicator is the seven of hearts, then for the next two plays of the game by the player, the seven of hearts, if appearing in the player cards, will be treated as wild. The player may also win additional fever plays in the two plays with additional cards acting as wild or be able to extend the quantity of fever plays, thereby building the ability to stack multiple fever plays.

Other embodiments of the fever mode include those where a different paytable is provided to the player. Preferably, the paytable is better than the paytable provided to the player during normal play of the game. A better paytable is one that, on average, pays more to the player by increasing the payback for winning combinations, by increasing the probability of achieving one or more winning combinations, by providing additional winning combinations, or by combinations thereof.

In various embodiments, the additional win opportunity is provided as a second evaluation. In these embodiments, the gaming system determines a second award, if any, that is based on the hand formed by replacing a predetermined or random quantity of player cards with card indicators. For example, if there is one player card that matches with a card indicator, the gaming system first determines an award, if any, purely based on the player cards. Next, the gaming system determines an award, if any, by replacing any one of the four non-matching player cards with their corresponding card indicators, to see if an award may be provided to the player.

In various embodiments, the additional win opportunity is provided as a combination of one or more of the above mentioned additional win opportunities. For example, in certain embodiments, the additional win opportunity is a combination of a wild card and a multiplier.

In various embodiments, the deck of playing cards from which player cards are randomly drawn by the gaming system includes one or more additional wild cards, such as jokers. In some of these embodiments, the additional wild cards, such as jokers, can also be used as card indicators.

In various embodiments, the gaming system requires the player to place an additional wager to enable the player to win additional win opportunities. In some of these embodiments, if the player does not make the additional wager, then the gaming system does not display the card indicators to the player. In various embodiments, the number of card indicators available to the player is related to the amount of credits wagered by the player. For example, the player is provided zero card indicators for a wager of one credit, one card indicator for a wager of two credits, two card indicators for a wager of three credits, and so on.

In various embodiments, the gaming system displays the card indicators to the player prior to the receipt of a wager from the player. That is, the player is able to view the card indicators that will be used for the play of the game, if the player decides to place a wager for that play of the game.

In various embodiments, the gaming system displays the card indicators to the player only after the player has completed the draw round in the video poker game. That is, the card indicators are shown after the player has made the decision to hold none, some, or all of the player cards. This adds a further level of anticipation and challenge to the player, as the player may end up discarding a player card that matches a card indicator. If there is still a match, then the additional win opportunity is provided. In certain of these embodiments, at least one of the card indicators is randomly determined by the gaming system to maintain the level of excitement. Further, in other embodiments where the card indicators are either predetermined or selected by the player prior to the play of the game, the positions are randomly determined by the gaming system.

In various embodiments, the additional win opportunity is provided as a progressive award. In certain of these embodiments, the player plays a secondary game for a chance to win a progressive or jackpot prize. In certain of these embodiments, the progressive win is unlocked for the player to win in subsequent plays of the game.

It should be appreciated by one skilled in the art that different embodiments include different base games without deviating from the scope of this disclosure. For example, in certain embodiments, the base game is a video poker game. In other embodiments, the base game is a variation of a video poker game, such as the Bonus Video Poker game.

In certain embodiments, the video poker game of the present disclosure is implemented as a multi-hand game. In various multi-hand embodiments, the player is dealt one set of five player cards from a single deck of 52 playing cards. The player is also provided five card indicators corresponding to the five player cards. The player is prompted to discard zero, some, or all of the player cards. The cards that are held are then replicated across a predetermined quantity of the other hands. For each of the predetermined quantity of hands, the discarded cards are replaced by other cards from a unique deck of 52 cards. Therefore, each of the predetermined quantity of hands has the same initial player cards that were held by the player. However, the cards that replace the quantity of discarded cards may be different for each player hand, as they are drawn from unique decks of playing cards. In certain of these multi-hand embodiments, one or more of the card indicators may also be different for two or more of the quantity of hands. In various other embodiments, the card indicators are the same as they are also replicated along with the held player hands.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred to herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 4A:
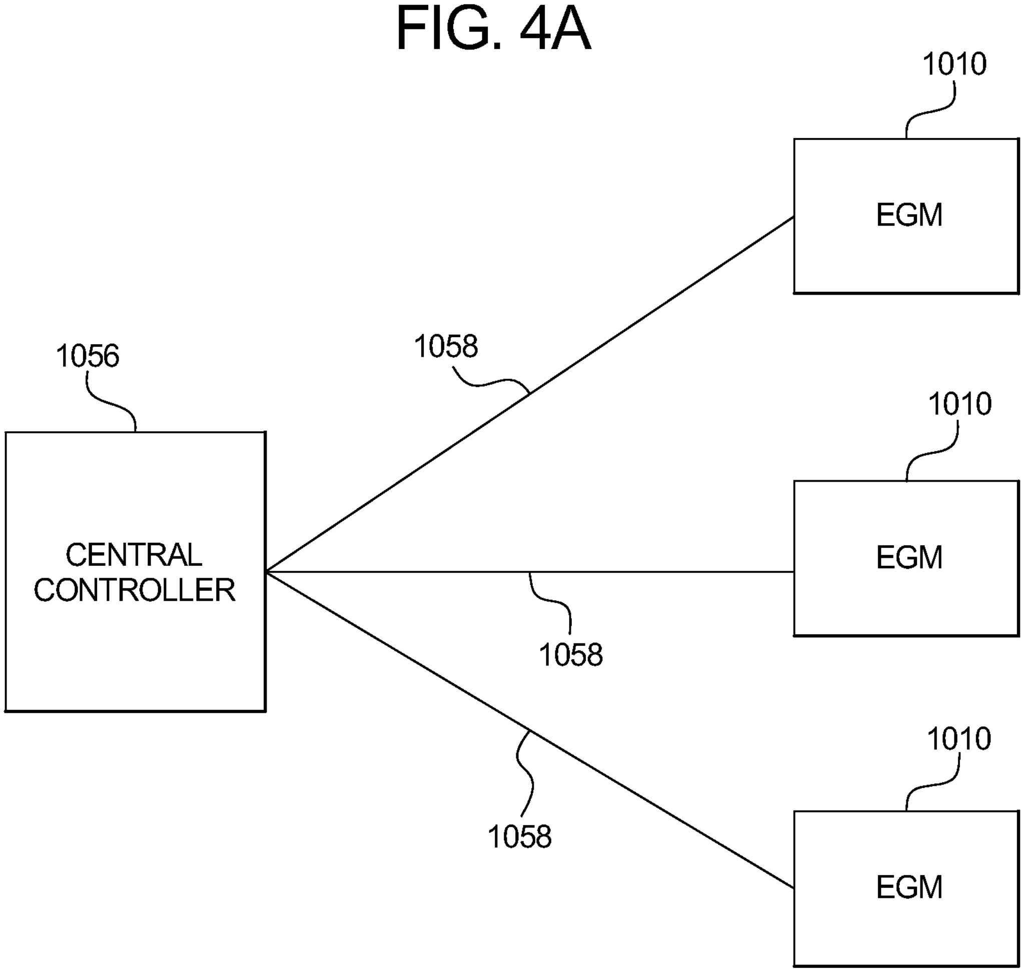
FIG. 4A is a schematic block diagram of one embodiment of a network configuration of the gaming system of the present disclosure.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 4A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described below, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 4B:
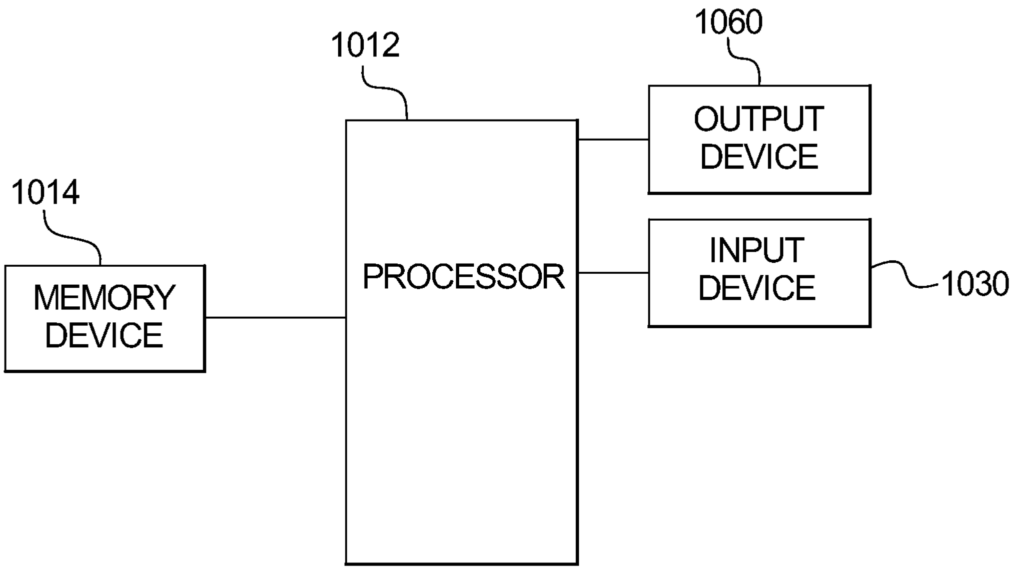
FIG. 4B is a schematic block diagram of an example electronic configuration of the gaming system of the present disclosure.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 4B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 4B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 5A:
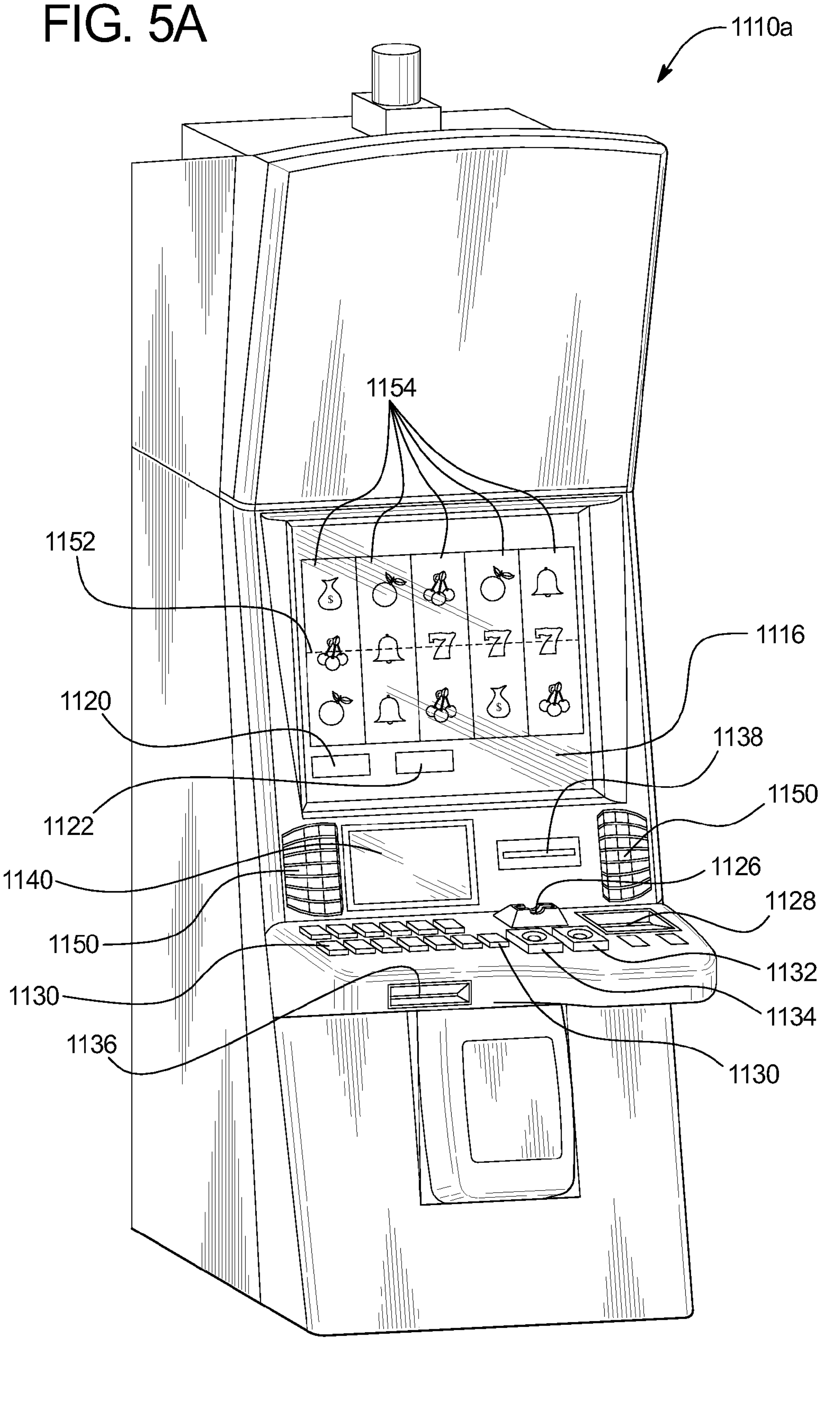
FIGS. 5A and 5B are perspective views of example alternative embodiments of the gaming system of the present disclosure.
Figure 5B:
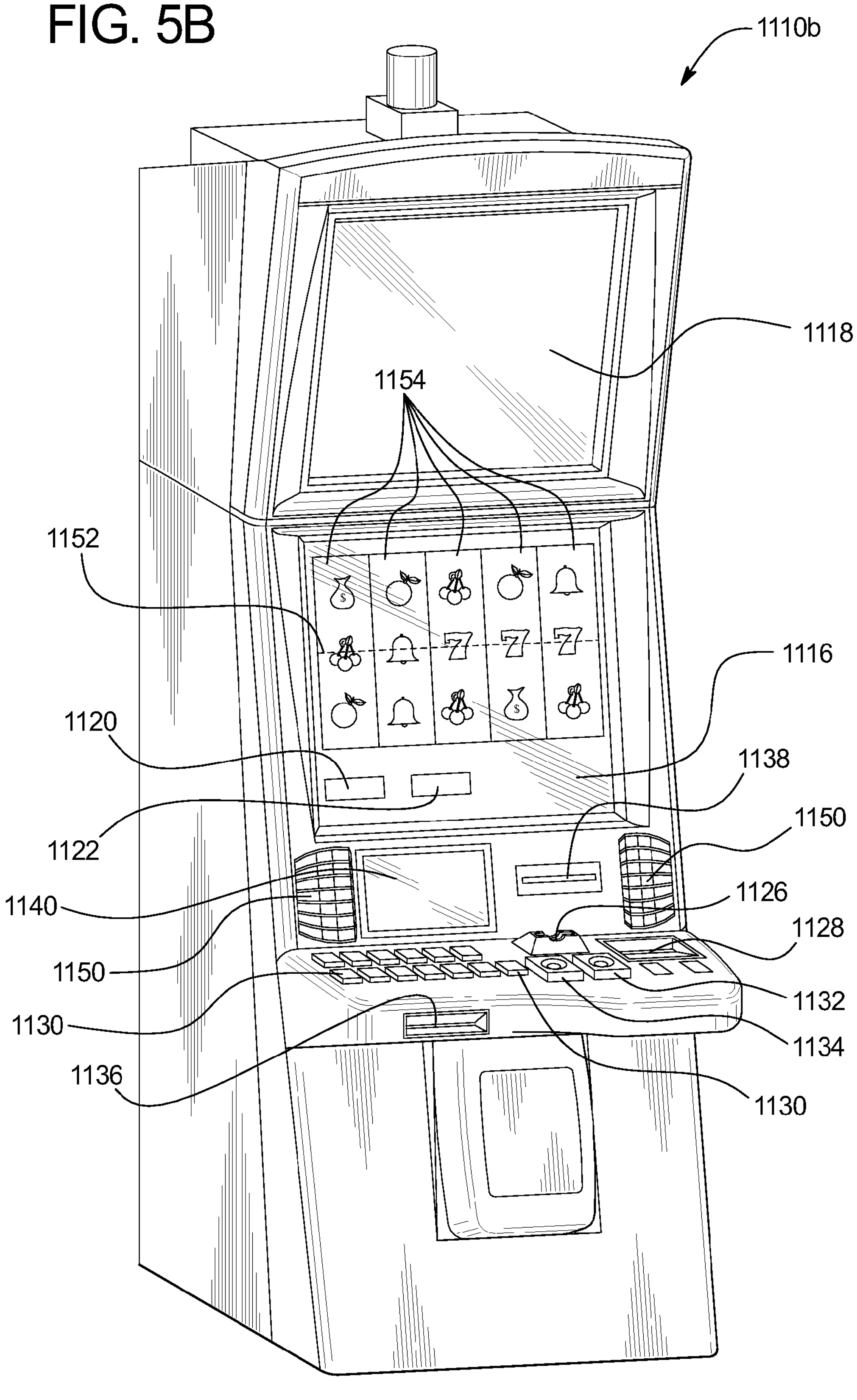

In various embodiments, the EGM includes one or more input devices. The input devices may include any suitable device that enables an input signal to be produced and received by the at least one processor of the EGM. The example EGM illustrated in FIG. 4B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 5A and 5B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 5A and 5B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 5A and 5B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 5A and 5B each include a card reader 1138. The card reader is configured to read a player identification card inserted into the card reader.

In various embodiments, the EGM includes one or more output devices. The example EGM illustrated in FIG. 4B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 5A includes a central display device 1116, a player tracking display 1140, a credit display 1120, and a bet display 1122. The example EGM illustrated in FIG. 4B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 5A and 5B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 5A and 5B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 5A and 5B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 5A and 5B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables an award or payout to be obtained addition to any award or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:
a housing;
at least one processor;
at least one display device supported by the housing;
a plurality of input devices supported by the housing, the plurality of input devices including an acceptor and a cashout device; and
at least one memory device storing a plurality of instructions which when executed by the at least one processor, cause the at least one processor to operate with the at least one display device and the plurality of input devices to:
(a) if a physical item is received via the acceptor, establish a credit balance based, at least in part, on a monetary value associated with the received physical item;
(b) for a gaming session including at least two plays of a game, determine a predetermined set of card indicators wherein:
(i) a quantity of the predetermined set of card indicators is less than or equal to a predetermined quantity of player cards for each play of the gaming session,
(ii) each of the card indicators of the predetermined set of card indicators corresponds to one of the player cards for each play of the gaming session,
(iii) each of the card indicators of the predetermined set of card indicators has a predetermined relationship to at least one other card indicator, and
(iv) the predetermined set of card indicators does not change for any play of the game of the gaming session;
(c) for each of the at least two plays of the game of the gaming session, upon placement of a wager, initiate that play of the game, wherein the credit balance is decreasable based on the placed wager, and for that play of the game:
(i) for each of the predetermined set of card indicators, display the card indicator at one of a plurality of card indicator positions;
(ii) display each of the predetermined quantity of player cards at one of a plurality of player card positions, wherein each player card position corresponds with one of the plurality of card indicator positions, each of the player cards in the predetermined quantity selected randomly from at least one deck of cards;
(iii) after receiving at least one input to discard zero or more player cards from the quantity of player cards, replace each of the discarded player cards with another card selected from the at least one deck of cards;
(iv) for each card indicator determine a match, if any, with the player card in the player card position that corresponds with the card indicator position of said card indicator;
(v) for at least one card indicator matching any non-corresponding player card, if any switch is available, enable the player to switch one of: (1) the matching player card in the non-corresponding player card position with the player card in the corresponding player card position, and (2) the card indicator in the non-corresponding card indicator position with the card indicator in the corresponding card indicator position;
(vi) for each card indicator matching its corresponding player card, provide an additional win opportunity; and
(vii) display an award, if any, based on the player cards and any additional win opportunity, wherein said credit balance is increasable based on any displayed award; and
(d) if a cashout input is received via the cashout device, cause an initiation of any payout associated with the credit balance.

2. The gaming system of claim 1, wherein the quantity of player cards is five.

3. The gaming system of claim 1, wherein the predetermined quantity of card indicators is equal to the predetermined quantity of player cards.

4. The gaming system of claim 1, wherein the plurality of instructions, when executed by the at least one processor, cause the at least one processor to operate with the at least one input device to enable a player to select the card indicators.

5. The gaming system of claim 4, wherein the card indicators are selected prior to placement of the wager.

6. The gaming system of claim 1, wherein the plurality of instructions, when executed by the at least one processor, cause the at least one processor to operate with the at least one display device to display the card indicators prior to placement of the wager.

7. The gaming system of claim 1, wherein each additional win opportunity includes one of a wild card, a bonus round, a multiplier and a fever mode.

8. The gaming system of claim 1, wherein the predetermined relationship is selected from the group consisting of: (a) same suit, (b) same rank, (c) consecutive rank, and (d) consecutive rank and same suit.

9. The gaming system of claim 1, wherein the switch is available if it has been accumulated via one of the group consisting of: a wager-based accumulation, an accumulation awarded to the player, and an accumulation earned by the player.

10. A method of operating a gaming system, said method comprising:
(a) after a physical item associated with a monetary value is received via an acceptor supported by a housing of the gaming system, causing at least one processor to execute a plurality of instructions stored in at least one memory device to establish a credit balance, based at least in part, on the monetary value associated with the physical item associated with the monetary value is received;
(b) for a gaming session including at least two plays of a game, causing the at least one processor to execute the plurality of instructions to determine a predetermined set of card indicators wherein:
(i) a quantity of the predetermined set of card indicators is less than or equal to a predetermined quantity of player cards for each play of the gaming session,
(ii) each of the card indicators of the predetermined set of card indicators corresponds to one of the player cards for each play of the gaming session,
(iii) each of the card indicators of the predetermined set of card indicators has a predetermined relationship to at least one other card indicator, and (iv) the predetermined set of card indicators does not change for any play of the game of the gaming session;

(c) for each of the at least two plays of the game of the gaming session, after receiving an actuation of a wager button, placing the wager and initiating that play of the game, the credit balance being decreasable by the placed wager, and for that play of the game:

(i) causing the at least one processor to execute the plurality of instructions to operate with at least one display device to for each of the predetermined set of card indicators, display the card indicator at one of a plurality of card indicator positions;

(ii) causing the at least one processor to execute the plurality of instructions to operate with the at least one display device to display each of the predetermined quantity of player cards at one of a plurality of player card positions, wherein each player card position corresponds with one of the plurality of card indicator positions, each of the player cards in the predetermined quantity selected randomly from at least one deck of cards;

(iii) causing the at least one processor to execute the plurality of instructions to operate with at least one input device to receive at least one input to discard zero or more player cards from the quantity of player cards;

(iv) causing the at least one processor to execute the plurality of instructions to operate with the at least one display device to replace each of the discarded player cards with another card selected from the at least one deck of cards;

(v) causing the at least one processor to execute the plurality of instructions to determine a match for each card indicator, if any, with the player card in the player card position that corresponds with the card indicator position of said card indicator; and (vi) for at least one card indicator matching any non-corresponding player card, if any switch is available, causing the at least one processor to execute the plurality of instructions to enable the player to switch one of: (1) the matching player card in the non-corresponding player card position with the player card in the corresponding player card position, and (2) the card indicator in the non-corresponding card indicator position with the card indicator in the corresponding card indicator position;

(vii) causing the at least one processor to execute the plurality of instructions to operate with the at least one display device to provide an additional win opportunity for each card indicator matching its corresponding player card; and (viii) causing the at least one processor to execute the plurality of instructions to operate with the at least one display device to display an award, if any, based on the player cards and any additional win opportunity, the credit balance being increasable by the displayed award; and (d) after receiving an actuation of a cashout button, causing the at least one processor to execute the plurality of instructions to initiate any payout associated with the credit balance.

11. The method of claim 10, wherein the quantity of player cards is five.

12. The method of claim 10, wherein the predetermined quantity of card indicators is equal to the predetermined quantity of player cards.

13. The method of claim 10, which includes causing the at least one processor to execute the plurality of instructions to operate with the at least one input device to enable a player to select the card indicators.

14. The method of claim 13, wherein the card indicators are selected prior to placement of the wager.

15. The method of claim 10, which includes causing the at least one processor to execute the plurality of instructions to operate with the at least one display device to display the card indicators prior to placement of the wager.

16. The method of claim 10, wherein each additional win opportunity includes one of a wild card, a bonus round, a multiplier and a fever mode.

17. The method of claim 10, which is provided through a data network.

18. The method of claim 17, wherein the data network is an internet.

19. The method of claim 10, wherein the predetermined relationship is selected from the group consisting of: (a) same suit, (b) same rank, (c) consecutive rank, and (d) consecutive rank and same suit.

20. The method of claim 10, wherein the switch is available if it has been accumulated via one of the group consisting of: a wager-based accumulation, an accumulation awarded to the player, and an accumulation earned by the player.

21. A non-transitory computer readable medium including a plurality of instructions, which when executed by at least one processor, cause the at least one processor to:

(a) after a physical item associated with a monetary value is received via an acceptor, establish a credit balance based at least in part, on the monetary value associated with the physical item;

(b) for a gaming session including at least two plays of a game, determine a predetermined set of card indicators wherein:

(i) a quantity of the predetermined set of card indicators is less than or equal to a predetermined quantity of player cards for each play of the gaming session, (ii) each of the card indicators of the predetermined set of card indicators corresponds to one of the player cards for each play of the gaming session, (iii) each of the card indicators of the predetermined set of card indicators has a predetermined relationship to at least one other card indicator, and (iv) the predetermined set of card indicators does not change for any play of the game of the gaming session;

(c) for each of the at least two plays of the game of the gaming session, after receiving an actuation of a wager button, place the wager and initiate that play of the game, the credit balance being decreasable by the placed wager, and for that play of the game:

(i) cause at least one display device to for each of the predetermined set of card indicators, display the card indicator at one of a plurality of card indicator positions;

(ii) cause the at least one display device to display each of the predetermined quantity of player cards at one of a plurality of player card positions, wherein each player card position corresponds with one of the plurality of card indicator positions, each of the player cards in the predetermined quantity selected randomly from at least one deck of cards;

(iii) cause at least one input device to receive at least one input to discard zero or more player cards from the quantity of player cards;

(iv) cause the at least one display device to replace each of the discarded player cards with another card selected from the at least one deck of cards;

(v) cause the at least one processor to execute a plurality of instructions to determine a match for each card indicator, if any, with the player card in the player card position that corresponds with the card indicator position of said card indicator; and (vi) for at least one card indicator matching any non-corresponding player card, if any switch is available, cause the at least one processor to execute the plurality of instructions to enable the player to switch one of: (1) the matching player card in the non-corresponding player card position with the player card in the corresponding player card position, and (2) the card indicator in the non-corresponding card indicator position with the card indicator in the corresponding card indicator position;

(vii) cause the at least one display device to provide an additional win opportunity for each card indicator matching its corresponding player card; and (viii) cause the at least one display device to display an award, if any, based on the player cards and any additional win opportunity, the credit balance being increasable by the displayed award; and (d) after receiving an actuation of a cashout button, initiate any payout associated with the credit balance.

22. The non-transitory computer readable medium of claim 21, wherein the quantity of player cards is five.

23. The non-transitory computer readable medium of claim 21, wherein the predetermined quantity of card indicators is equal to the predetermined quantity of player cards.

24. The non-transitory computer readable medium of claim 21, wherein when executed by the at least one processor, the plurality of instructions cause the at least one processor to operate with the at least one input device to enable a player to select the card indicators.

25. The non-transitory computer readable medium of claim 24, wherein the card indicators are selected prior to placement of the wager.

26. The non-transitory computer readable medium of claim 21, wherein when executed by the at least one processor, the plurality of instructions cause the at least one processor to operate with the at least one display device to display the card indicators prior to placement of the wager.

27. The non-transitory computer readable medium of claim 21, wherein each additional win opportunity includes one of a wild card, a bonus round, a multiplier and a fever mode.

28. The non-transitory computer readable medium of claim 21, wherein the predetermined relationship is selected from the group consisting of: (a) same suit, (b) same rank, (c) consecutive rank, and (d) consecutive rank and same suit.

29. The non-transitory computer readable medium of claim 21, wherein the switch is available if it has been accumulated via one of the group consisting of: a wager-based accumulation, an accumulation awarded to the player, and an accumulation earned by the player.

* * * * *